(12) United States Patent
Gibbons et al.

(10) Patent No.: US 7,134,170 B2
(45) Date of Patent: Nov. 14, 2006

(54) PLASTIC RETAINING CLIP FOR RIB ATTACHMENT

(75) Inventors: Matthew H. Gibbons, Farmington Hills, MI (US); Roger E. Pilon, Avoca, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/301,275

(22) Filed: Nov. 21, 2002

(65) Prior Publication Data

US 2003/0093883 A1 May 22, 2003

Related U.S. Application Data

(60) Provisional application No. 60/331,888, filed on Nov. 21, 2001.

(51) Int. Cl.
 *F16B 5/06* (2006.01)
(52) U.S. Cl. .......................... 24/289; 24/295
(58) Field of Classification Search ................ 24/297, 24/289, 293–295; 52/716.7; 296/146.7
 See application file for complete search history.

(56) References Cited

U.S. PATENT DOCUMENTS

| | | | |
|---|---|---|---|
| 484,779 A | 10/1892 | Cone | |
| 1,845,991 A | 2/1932 | Walters | |
| 2,178,719 A * | 11/1939 | Cotter | 24/293 |
| 2,275,553 A | 3/1942 | Place | |
| 2,540,396 A | 2/1951 | Krach | |
| 2,692,414 A | 10/1954 | Poupitch | |
| 2,955,690 A | 10/1960 | Bedford, Jr. | |
| 2,983,008 A | 5/1961 | VonRath | |
| 3,000,066 A | 9/1961 | Cochran | |
| 3,006,049 A * | 10/1961 | Jansson | 24/289 |
| 3,009,222 A | 11/1961 | Gillaspie | |
| 3,018,529 A | 1/1962 | Perrochat | |
| 3,029,486 A | 4/1962 | Raymond | |
| 3,034,615 A | 5/1962 | Kern | |
| 3,037,596 A | 6/1962 | Fordyce | |
| 3,040,401 A | 6/1962 | VonRath | |
| 3,063,114 A | 11/1962 | Perrochat | |
| 3,093,874 A | 6/1963 | Rapata | |
| 3,110,068 A | 11/1963 | Perrochat | |
| 3,115,225 A | 12/1963 | Fraylick et al. | |
| 3,213,506 A | 10/1965 | Fernberg | |
| 3,230,592 A | 1/1966 | Hosea | |
| 3,249,973 A | 5/1966 | Seckerson | |
| 3,309,955 A | 3/1967 | Turnbull et al. | |
| 3,412,437 A | 11/1968 | Bennett | |
| 3,478,395 A | 11/1969 | Flora | |
| 3,494,244 A | 2/1970 | Wayland | |
| 3,550,217 A | 12/1970 | Collyer | |
| 3,577,603 A | 5/1971 | Seckerson et al. | |

(Continued)

FOREIGN PATENT DOCUMENTS

DE 195 19 623 A1 12/1996

(Continued)

*Primary Examiner*—James R. Brittain
(74) *Attorney, Agent, or Firm*—Harness, Dickey & Pierce, P.L.C.

(57) ABSTRACT

A resilient clip for engaging a structure and having a body portion with a pair of top flanges, a pair of fastening members and a pair of abutting flanges. Each of the fastening members has a base portion that is coupled to an associated one of the top flanges. Each of the abutting flanges has a locking fingers which engages the mounting structure. Finger flange portions are configured to engage a first side of a mounting flange on an interior trim component.

20 Claims, 4 Drawing Sheets

U.S. PATENT DOCUMENTS

| | | | |
|---|---|---|---|
| 3,665,800 A | 5/1972 | Ryder | |
| 3,678,797 A | 7/1972 | Seckerson | |
| 3,695,324 A | 10/1972 | Gulistan | |
| 3,745,612 A | 7/1973 | Seckerson | |
| 3,771,275 A | 11/1973 | Seckerson | |
| 3,810,279 A | 5/1974 | Swick et al. | |
| 3,860,999 A * | 1/1975 | Meyer | 411/510 |
| 3,897,712 A | 8/1975 | Black | |
| 3,905,270 A | 9/1975 | Hehl | |
| 3,952,476 A | 4/1976 | Barnett et al. | |
| 3,988,808 A | 11/1976 | Poe et al. | |
| 4,122,583 A | 10/1978 | Grittner et al. | |
| 4,176,428 A | 12/1979 | Kimura | |
| 4,261,243 A | 4/1981 | Palmer | |
| 4,270,328 A | 6/1981 | Page et al. | |
| 4,300,865 A | 11/1981 | Murray | |
| 4,312,614 A | 1/1982 | Palmer et al. | |
| 4,363,160 A | 12/1982 | Wibrow | |
| D268,006 S | 2/1983 | Wollar | |
| D268,894 S | 5/1983 | Wollar | |
| 4,392,278 A | 7/1983 | Mugglestone | |
| 4,396,329 A | 8/1983 | Wollar | |
| 4,420,859 A | 12/1983 | Hammerle | |
| 4,422,276 A | 12/1983 | Paravano | |
| 4,424,612 A | 1/1984 | Muller et al. | |
| 4,427,328 A | 1/1984 | Kojima | |
| 4,431,355 A | 2/1984 | Junemann | |
| 4,470,179 A | 9/1984 | Gollin et al. | |
| 4,489,465 A | 12/1984 | Lemkin | |
| 4,499,636 A | 2/1985 | Tanaka | |
| 4,505,611 A | 3/1985 | Nagashima et al. | |
| 4,547,108 A | 10/1985 | Nakama | |
| 4,568,215 A | 2/1986 | Nelson | |
| D284,934 S | 8/1986 | Okawa | |
| 4,630,338 A | 12/1986 | Osterland et al. | |
| 4,644,612 A | 2/1987 | Osterland | |
| 4,668,145 A | 5/1987 | Hirohata | |
| 4,676,707 A | 6/1987 | Cearlock et al. | |
| D291,055 S | 7/1987 | Fukuhara et al. | |
| 4,683,622 A * | 8/1987 | Oehlke | 24/458 |
| 4,715,095 A | 12/1987 | Takahashi | |
| D293,882 S | 1/1988 | Takahashi | |
| D293,883 S | 1/1988 | Hirohata | |
| D293,884 S | 1/1988 | Hirohata | |
| 4,716,633 A | 1/1988 | Rizo | |
| 4,717,301 A | 1/1988 | Oddenino | |
| 4,728,238 A | 3/1988 | Chisholm et al. | |
| 4,739,543 A | 4/1988 | Harris, Jr. | |
| D297,613 S | 9/1988 | Yokoyama et al. | |
| D297,614 S | 9/1988 | Yokoyama et al. | |
| D297,615 S | 9/1988 | Nakama | |
| 4,776,739 A | 10/1988 | Hamman | |
| 4,778,320 A | 10/1988 | Nakama | |
| 4,779,313 A | 10/1988 | Gonas | |
| D298,736 S | 11/1988 | Shiraishi | |
| D298,801 S | 12/1988 | Satoh | |
| 4,810,147 A | 3/1989 | Hirohata | |
| 4,821,381 A | 4/1989 | Kaneko et al. | |
| 4,850,773 A | 7/1989 | Asami | |
| 4,861,208 A | 8/1989 | Boundy | |
| 4,865,505 A * | 9/1989 | Okada | 411/512 |
| 4,874,276 A | 10/1989 | Iguchi | |
| 4,890,966 A | 1/1990 | Umezawa | |
| 4,927,287 A | 5/1990 | Ohkawa et al. | |
| 4,938,645 A | 7/1990 | Wollar | |
| 4,973,212 A | 11/1990 | Jacobs | |
| 4,987,656 A | 1/1991 | Sato | |
| 5,011,356 A | 4/1991 | Fernandez | |
| 5,039,267 A | 8/1991 | Wollar | |
| 5,046,223 A | 9/1991 | Kraus | |
| 5,056,199 A | 10/1991 | Stein et al. | |
| 5,104,272 A | 4/1992 | Dupont et al. | |
| 5,106,223 A | 4/1992 | Kraus | |
| 5,163,730 A | 11/1992 | Welch | |
| 5,168,604 A | 12/1992 | Boville | |
| 5,173,026 A | 12/1992 | Cordola et al. | |
| 5,217,337 A | 6/1993 | Junemann et al. | |
| 5,288,530 A | 2/1994 | Maki | |
| 5,291,639 A | 3/1994 | Baum et al. | |
| 5,301,396 A | 4/1994 | Benoit | |
| 5,319,839 A | 6/1994 | Shimajiri | |
| 5,347,690 A * | 9/1994 | Mansoor et al. | 24/295 |
| 5,353,571 A * | 10/1994 | Berdan et al. | 52/716.5 |
| 5,373,611 A | 12/1994 | Murata | |
| D354,219 S | 1/1995 | Shimajiri | |
| D355,113 S | 2/1995 | Shimajiri | |
| 5,387,065 A | 2/1995 | Sullivan | |
| 5,393,185 A | 2/1995 | Duffy, Jr. | |
| 5,419,606 A | 5/1995 | Hull et al. | |
| 5,421,067 A | 6/1995 | Akachi et al. | |
| 5,468,108 A | 11/1995 | Sullivan et al. | |
| 5,507,610 A | 4/1996 | Benedetti et al. | |
| 5,509,182 A | 4/1996 | Nakanishi | |
| 5,517,731 A * | 5/1996 | Spykerman | 24/295 |
| 5,533,237 A | 7/1996 | Higgins | |
| 5,542,158 A * | 8/1996 | Gronau et al. | 24/295 |
| 5,568,675 A | 10/1996 | Asami et al. | |
| 5,573,362 A | 11/1996 | Asami et al. | |
| 5,580,204 A | 12/1996 | Hultman | |
| 5,592,719 A | 1/1997 | Eto et al. | |
| 5,598,609 A | 2/1997 | Asami | |
| D378,349 S | 3/1997 | Saito et al. | |
| 5,624,319 A | 4/1997 | Golczyk et al. | |
| 5,630,256 A | 5/1997 | Kanno | |
| 5,632,581 A | 5/1997 | Hasada | |
| 5,641,195 A | 6/1997 | Patel et al. | |
| 5,641,255 A | 6/1997 | Tanaka | |
| D381,258 S | 7/1997 | Saito | |
| 5,647,713 A | 7/1997 | Ge et al. | |
| 5,651,634 A | 7/1997 | Kraus | |
| D382,468 S | 8/1997 | Takahashi | |
| 5,689,863 A | 11/1997 | Sinozaki | |
| 5,694,666 A | 12/1997 | Hamamoto | |
| 5,704,753 A | 1/1998 | Ueno | |
| D390,776 S | 2/1998 | Ueno | |
| 5,716,161 A | 2/1998 | Moore et al. | |
| 5,718,549 A | 2/1998 | Noda et al. | |
| 5,758,987 A | 6/1998 | Frame et al. | |
| 5,797,714 A | 8/1998 | Oddenino | |
| 5,833,480 A | 11/1998 | Austin | |
| 5,850,676 A | 12/1998 | Takahashi et al. | |
| 5,851,097 A | 12/1998 | Shereyk et al. | |
| 5,887,319 A | 3/1999 | Smith | |
| 5,975,820 A | 11/1999 | Kirchen | |
| 5,987,714 A | 11/1999 | Smith | |
| 6,039,408 A | 3/2000 | Alvarez | |
| 6,039,523 A | 3/2000 | Kraus | |
| 6,042,296 A | 3/2000 | Wittig et al. | |
| 6,045,309 A | 4/2000 | LeVey | |
| 6,049,952 A * | 4/2000 | Mihelich et al. | 24/292 |
| 6,074,150 A | 6/2000 | Shinozaki et al. | |
| 6,101,686 A | 8/2000 | Velthoven et al. | |
| 6,196,607 B1 | 3/2001 | Gulisano | |
| 6,205,625 B1 | 3/2001 | Kato | |
| 6,209,178 B1 | 4/2001 | Wiese et al. | |
| 6,264,393 B1 | 7/2001 | Kraus | |
| 6,287,043 B1 | 9/2001 | Kraus | |
| 6,305,055 B1 | 10/2001 | Castro | |
| 6,336,768 B1 | 1/2002 | Kraus | |
| 6,364,589 B1 | 4/2002 | Wenglinski | |
| D456,699 S | 5/2002 | Nakanishi | |
| 6,398,473 B1 | 6/2002 | Kraus | |
| 6,406,236 B1 | 6/2002 | Olson, Jr. | |
| 6,431,585 B1 | 8/2002 | Rickabus et al. | |

| | | |
|---|---|---|
| 6,449,814 B1 | 9/2002 | Dinsmore et al. |
| 6,457,217 B1 | 10/2002 | Yoshii et al. |
| 6,474,921 B1 | 11/2002 | Gordon |
| 6,484,370 B1 | 11/2002 | Kanie et al. |
| 6,514,024 B1 | 2/2003 | Akema et al. |
| D471,084 S | 3/2003 | Nemoto |
| 6,568,045 B1 * | 5/2003 | Smith .................... 24/295 |
| 6,572,317 B1 | 6/2003 | Okada et al. |
| 6,575,681 B1 | 6/2003 | Kojima et al. |
| 6,594,870 B1 | 7/2003 | Lambrecht et al. |
| 6,612,795 B1 | 9/2003 | Kirchen |
| 6,644,886 B1 | 11/2003 | Schwarz |
| 6,681,543 B1 | 1/2004 | Nada et al. |
| 6,685,407 B1 | 2/2004 | Holzman et al. |
| 2002/0007537 A1 | 1/2002 | Lubert et al. |
| 2002/0028123 A1 | 3/2002 | Miura et al. |
| 2002/0037206 A1 | 3/2002 | Okada et al. |
| 2002/0106261 A1 | 8/2002 | Nakanishi |
| 2002/0131846 A1 | 9/2002 | Kojima et al. |
| 2003/0000048 A1 | 1/2003 | Boville |
| 2003/0093883 A1 | 5/2003 | Gibbons et al. |
| 2003/0145437 A1 | 8/2003 | Medgyes |
| 2003/0159256 A1 | 8/2003 | Clarke |
| 2004/0016088 A1 | 1/2004 | Angellotti |
| 2004/0020016 A1 | 2/2004 | Yoneoka |

FOREIGN PATENT DOCUMENTS

| | | |
|---|---|---|
| DE | 100 53 200 A1 | 5/2002 |
| EP | 0 937 898 B1 | 11/2001 |
| GB | 2 082 668 A | 3/1982 |
| GB | 2 091 801 A | 8/1982 |
| WO | WO 03/029663 A1 | 4/2003 |
| WO | WO 03/046393 A1 | 6/2003 |

* cited by examiner

PLASTIC RETAINING CLIP FOR RIB ATTACHMENT

CROSS-REFERENCE TO RELATED APPLICATIONS

This application claims the benefit of U.S. Provisional Application No. 60/331,888, filed on Nov. 21, 2001. The disclosure of the above application is incorporated herein by reference.

TECHNICAL FIELD

The present invention relates generally to resilient clip fasteners and more particularly to a resilient clip fastener that employs a two piece geometry to secure the body portion of the resilient clip to a structure. More specifically, the present invention relates to a resilient clip fastener having a construction that utilizes a plastic body portion which is coupled to a metal retainer having abutment flanges to couple of an attachment flange. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal.

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In one preferred form, the present invention provides a resilient clip for engaging a structure. The resilient clip includes a body portion having a coupling region, a metal retainer is coupled to the coupling region. The metal fastener a pair of fastening members an abutting flange. Each of the fastening members are coupled by a base portion that is coupled to an associated top flange. The abutting flange has fingers that engages the mounting structure.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figures 1, 2:
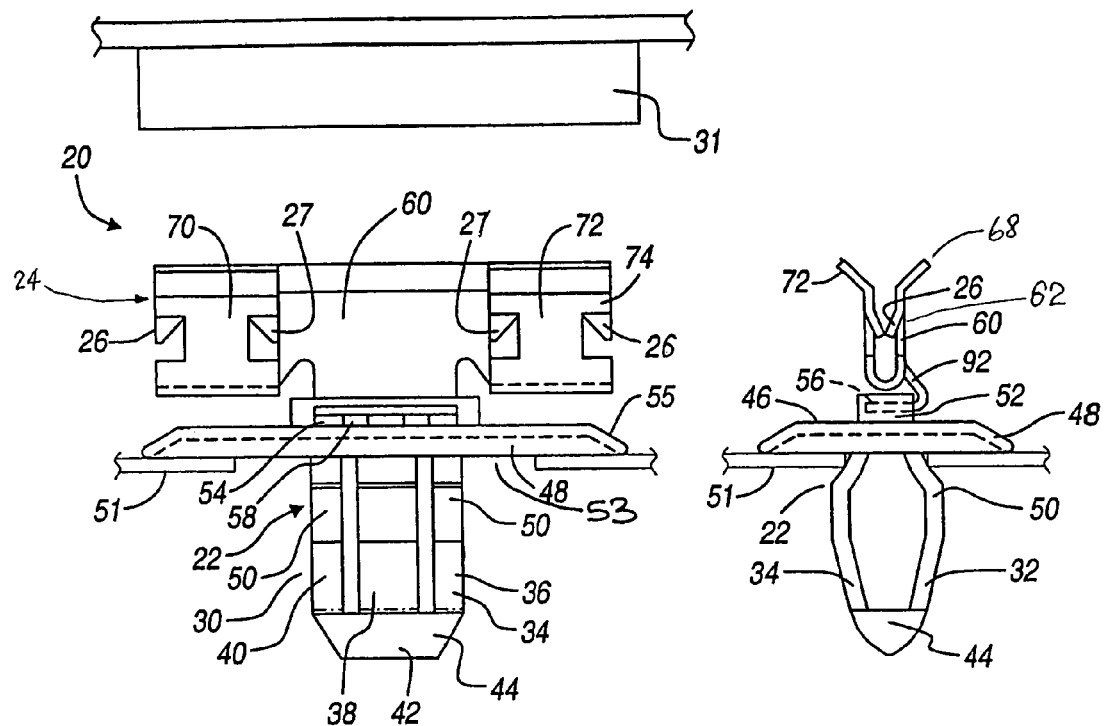
FIG. 1 is a front view of a fastener constructed in accordance with the teachings of the present invention.
FIG. 2 is a side view of the fastener of FIG. 1.
Figure 3:
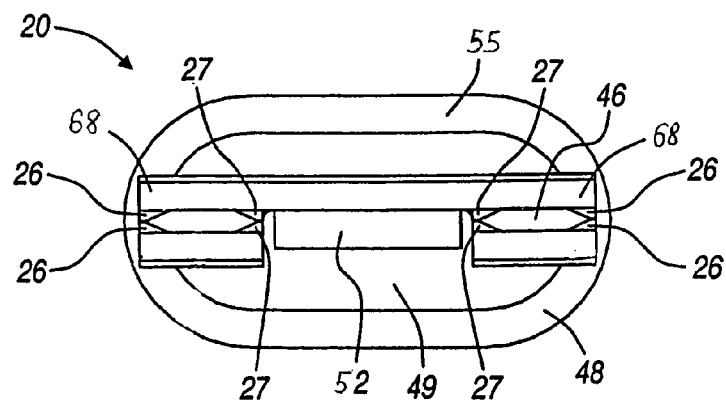
FIG. 3 is a top view of a portion of the fastener of FIG. 1 illustrating the spacing of the structures in greater detail.
Figure 4A:
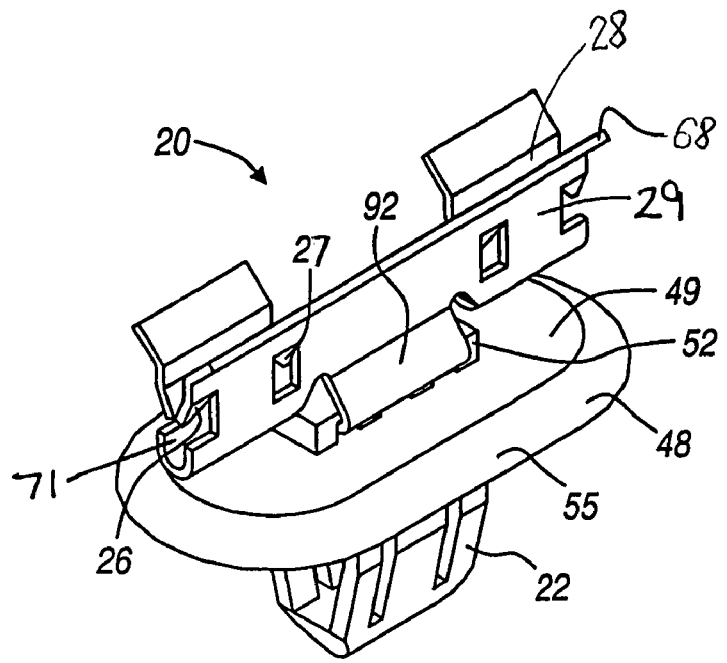
FIGS. 4a and 4b are perspective views of the fastener shown in FIG. 1.
Figure 4B:
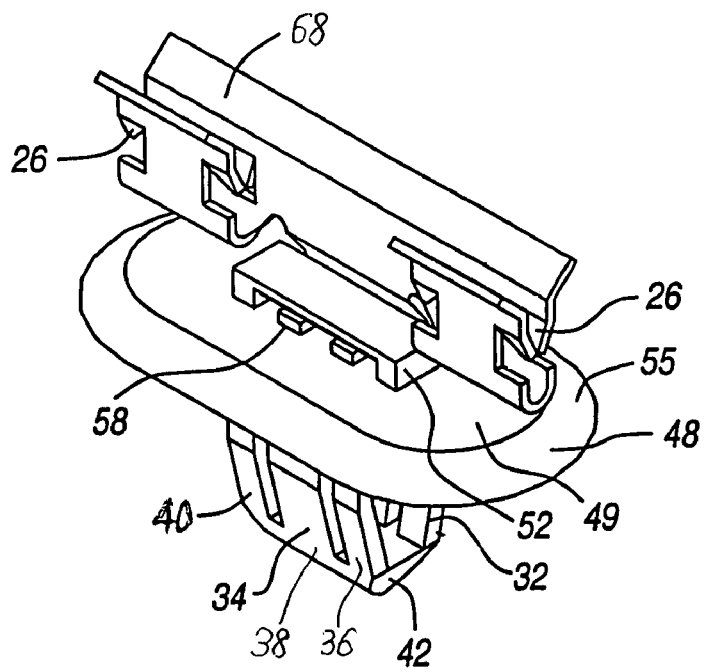

Referring to FIGS. 1 through 4b, a two-piece fastener 20 in accordance with the present invention is disclosed. The two-piece fastener 20 is defined by a plastic body portion 22 and a metal retainer 24. Integral with the metal retainer 24 are pairs of engaging fingers 26 and 27 disposed on abutting flanges 28 and 29 which are used to couple the two-piece fastener 20 to a mounting flange 31 of trim component (not shown). Additionally, the body portion 22 has a locking portion 30 which is formed by two sets 32 and 34 of three locking members 36, 38, 40. The two sets 32 and 34 of three locking members 36, 38, 40 are coupled together at a proximal end 42 by an angled or wedge-shaped member 44. The two sets 32 and 34 of three locking members 36, 38, 40 are coupled together at a distal end 46 by a sealing umbrella portion 48. Each of the three locking members 36, 38, 40 define retaining snap in teeth 50 which facilitate the coupling of the plastic body portion 22 to a sheet metal structure 51.

The umbrella portion 48 functions to seal the mounting hole 53 in the sheet metal structure 51 and is formed of an oval planar portion 49 which is surrounded by a generally oval deformable portion 55. The teeth 50 are configured to pull the deformable oval portion onto the sheet metal 51.

Coupled to the distal end 46 and disposed on the sealing umbrella portion 48 is a retaining flange 52 which functions to fluidly seal the aperture. Cut into the retaining flange 52 is a slot 54 which couples to a metal flange 56 on the metal retainer 24. Disposed within the slot 54 is a pair of members 58 which facilitate the frictional engagement of the slot 54 with the metal flange 56.

Generally, the abutting flanges 28 and 29 of the metal retainer 24 are defined by three portions. The first portion 60 is defined by a planar engaging surface 62. Disposed on the planar engaging surface 62 is a first pair of engaging fingers 26 and 27, which point toward the proximal end of the body portion 22. The first portion 60 further has an angled insertion portion 68 which facilitates the insertion of the mounting flange 31. The second and third portions 70 and 72 are coplanar and defined by planar engaging surfaces 74 and 76. Each of the planar engaging surface 74 and 76 are generally parallel to the first portion 60 and have a second pair of engaging fingers 26 and 27 which function to fix the mounting flange within the metal retainer 24. The engaging fingers 26 and 27 of the first portion 60 point generally toward the proximal end of the body 22 and act in conjunction with the engaging fingers 26 and 27 of the second and third portions 70 and 72 to clasp the mounting flange 31. The first portion 60 further defines a transition member 92 which couples the first portion 60 to the metal flange 56 on the metal retainer 24. Disposed between the first portion 60 and the second and third portions 70 and 72 is a curved coupling region 71. The curved coupling region 71 functions as a spring member and biases the first through third portions 60, 70, 72 together.

Referring generally to FIGS. 5 through 8b which depict views of a two-piece fastener 93 according to the teachings of a second embodiment of the current invention. Shown is a second type of metal retainer 94 coupled to the plastic body portion 22. The metal retainer 94 is generally S-shaped and has a pair of abutting flanges 96 and 98. The first abutting flange 96 has two pair of parallel fingers which engage the mounting flange 31 of a trim component. Both abutting flanges 96 and 98 have angled portions 102 and 104 which function to guide the mounting flange 31 between the abutting flanges 96 and 98. The metal retainer 94 includes a c-shaped flange 106 which is configured to be elastically deformed so that it can couple to a plastic flange 108 on the umbrella portion 48 of the plastic body portion 22. The plastic flange 108 has a tooth portion 110 which engages an engaging finger 112 on the c-shaped flange 106.

Figure 5:
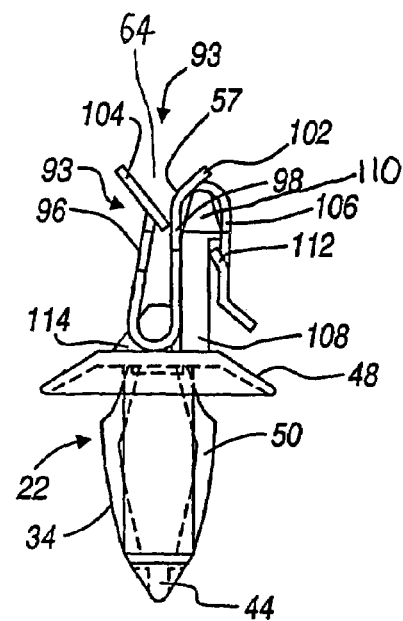
FIG. 5 is a side view of a second embodiment of the present invention.
Figure 7:
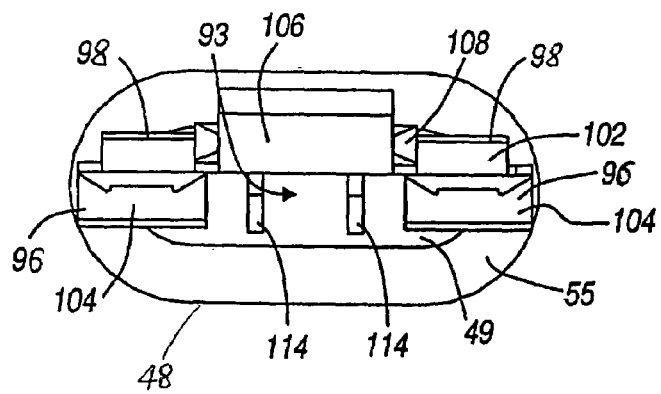
FIG. 7 is a top view of the fastener shown in FIG. 5.
Figure 8A:
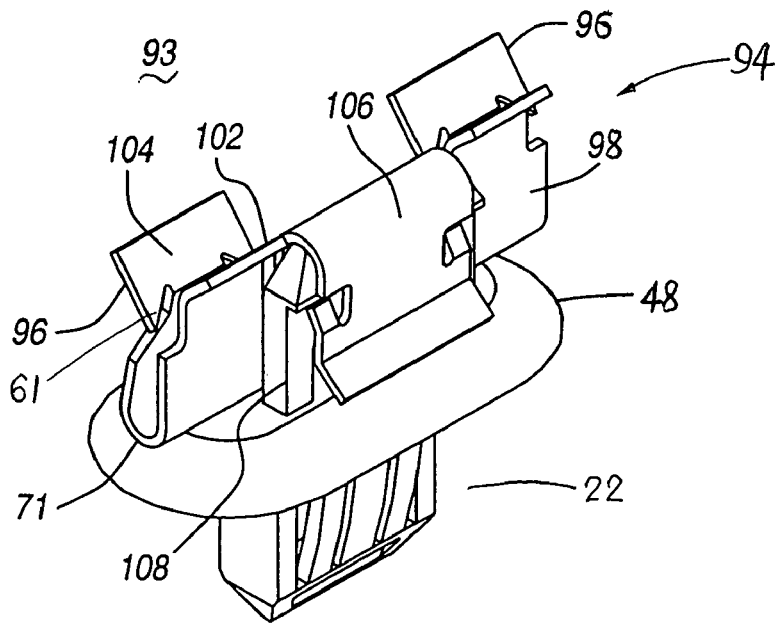
FIGS. 8a and 8b are perspective views of the fastener shown in FIG. 5.
Figure 8B:
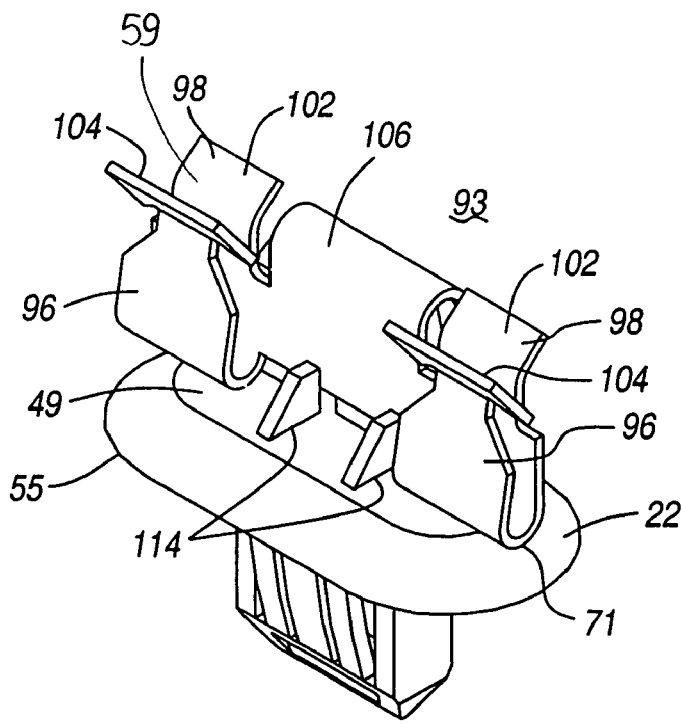

FIG. 5 is a side view of the two-piece fastener 93 and shows the relationship of the abutting flanges 96 and 98 to mounting flange 31. As can be seen, the metal retainer 94 defines an upper keyhole slot 64 which facilitates the displacement of the abutting flanges 96 and 98 when the mounting flange 31 is inserted. The umbrella portion 48 of the plastic body portion 22 further has a stop 114 defined thereon. The stop additionally functions to prevent rotation of the metal retainer 94 with respect to the body portion 22. The stop is configured to limit the amount of insertion of the mounting flange 31. Further depicted is the angular relationship of the c-shaped flange 106 which couples to a plastic flange 108.

Figure 6:
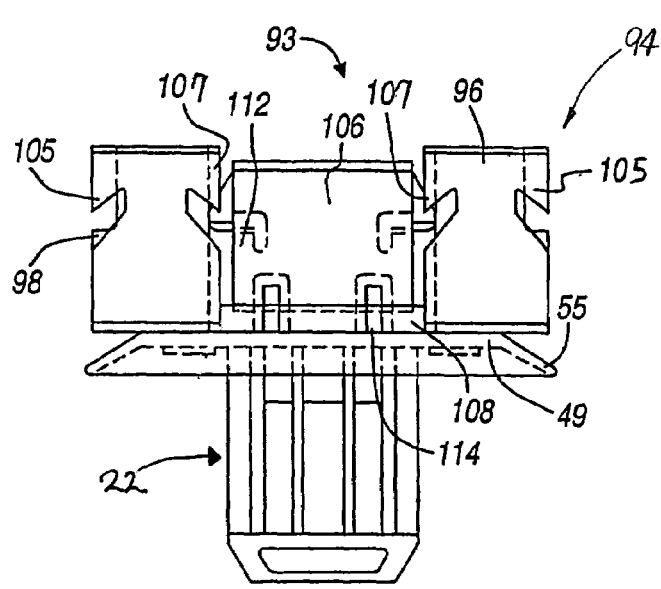
FIG. 6 is a front view of the two-piece fastener shown in FIG. 4.

FIG. 6 depicts a front view of the two-piece fastener 93. Shown is the first abutting flanges 96 and 98 which have two pair of parallel fingers 105 and 107 which engage the mounting flange 31. Both abutting flanges 96 and 98 have angled portions 102 an 104 which function to guide the mounting flange 31 between the abutting flanges 96 and 98. The interior convex surface 59 of the abutting flange 98 is configured to engage mounting flange 31 to hold the trim component in place. Also depicted is the interior surface 61 of the finger members 105 and 107, which engage the surfaces of the mounting flange 31.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A fastener for coupling a flanged component to an aperture formed in a sheet metal component comprising:
 a body portion having a locking portion configured to be passed from a first side of the sheet metal to a second side of the sheet metal through the aperture to be mated with the aperture;
 an umbrella portion connected to the body portion; and
 a metal retainer connected to the body portion and disposed on the first side of the sheet metal and including a pair of generally parallel clamping flanges which are generally parallel to the locking portion, at least one of the clamping flanges having a locking member, the locking member configured to releasably engage a flange on the flanged component;
 wherein the locking portion engages only a portion of the entire periphery of the aperture and wherein the umbrella portion contacts the first side of the sheet metal around the aperture for covering the aperture.

2. The fastener according to claim 1 wherein said body portion comprises a retaining flange defining a coupling opening and the umbrella portion is coupled to the retaining flange, the umbrella portion being configured to fluidly seal the aperture.

3. The fastener according to claim 1 wherein the locking portion comprises a plurality of deformable members, each member defining a tooth configured to engage the aperture.

4. The fastener according to claim 3 wherein the deformable members are coupled to the umbrella portion.

5. The fastener according to claim 3 wherein the deformable members are coupled to a wedged-shaped portion.

6. The fastener according to claim 1 wherein the body portion defines a tooth portion configured to mate with the metal retainer.

7. The fastener according to claim 6 wherein the metal retainer defines an engagement finger configured to engage the tooth portion.

8. The fastener according to claim 6 wherein the metal retainer comprises a generally c-shaped flange configured to engage the tooth portion.

9. The fastener according to claim 1 wherein said body portion comprises a retaining flange defining a coupling opening and the coupling opening of the retaining flange is configured to releasably engage an engagement member of the metal retainer.

10. The fastener according to claim 1 wherein the metal retainer comprises a generally c-shaped flange configured to engage the body portion.

11. A fastener for coupling a flanged component to an aperture defined in sheet metal comprising:
 a body portion comprising a locking portion configured to be passed from a first side of the sheet metal to a second side of the sheet metal to mate with the aperture, and an umbrella portion, said umbrella portion defining a retaining flange; and
 a metal retainer comprising a pair of clamping flanges which are generally parallel to the locking portion, at least one of said clamping flanges defining an angled insertion portion, and at least one of said clamping flanges having a locking finger configured to engage a flange of the component, wherein the clamping flanges define a slot configured to releasably engage the flange of the component, wherein the locking portion engages only a portion of the entire periphery of the aperture and wherein the metal retainer is mounted to the body portion through the retaining flange the umbrella portion being completely disposed on the first side of the sheet metal, and contacting the first side of the sheet metal around the aperture.

12. The fastener according to claim 11 further comprising a c-shaped flange configured to mate with the retaining flange.

13. The fastener according to claim 11 wherein the retaining flange comprises a tooth.

14. The fastener according to claim 11 wherein the locking portion defines a plurality of deformable members at least one of the deformable members defines a tooth configured to mate with the aperture.

15. The fastener according to claim 14 wherein the deformable members are coupled to the umbrella portion.

16. The fastener according to claim 14 wherein the deformable members are coupled by a wedge-shaped member.

17. A fastener for coupling a flange component to an aperture comprising:
   a body portion defining a locking portion and an umbrella portion, the umbrella portion defining a retaining member, the retaining member defining a tooth;
   an s-shaped metallic retainer comprising a pair of generally parallel retaining flanges, the retaining flanges defining an angled insertion portion and at least one retention tooth, the metallic retainer further having a c-shaped flange configured to engage the retaining member of the body portion.

18. The fastener according to claim 17 wherein the body portion comprises a stop configured to limit the insertion of the flange of the component.

19. The fastener according to claim 18 wherein the stop restricts the movement of the s-shaped metallic retainer.

20. The fastener according to claim 17 wherein the umbrella portion defines a generally oval base and an oval deformable portion.

* * * * *